US007139577B1

(12) United States Patent
Morper

(10) Patent No.: US 7,139,577 B1
(45) Date of Patent: Nov. 21, 2006

(54) METHOD FOR CALL CONTROL OF COMMUNICATION TERMINAL EQUIPMENT WIRELESSLY CONNECTED TO COMMUNICATION NETWORKS

(75) Inventor: Hans-Jochen Morper, Erdweg (DE)

(73) Assignee: Siemens Aktiengesellschaft, Munich (DE)

( * ) Notice: Subject to any disclaimer, the term of this patent is extended or adjusted under 35 U.S.C. 154(b) by 1210 days.

(21) Appl. No.: 08/932,704

(22) Filed: Sep. 18, 1997

(30) Foreign Application Priority Data

Sep. 26, 1996 (DE) ................................ 196 39 608

(51) Int. Cl.
*H04Q 7/20* (2006.01)

(52) U.S. Cl. .................... 455/445; 455/414.1; 455/417; 455/432.1; 379/211.01; 379/212.01; 370/238; 370/338; 370/389; 370/392; 370/395.52

(58) Field of Classification Search ........ 375/219–220; 455/426, 414, 417, 436, 445, 465, 74.1, 427, 455/428, 414.1, 426.1, 432.1, 433, 435.11, 455/444–446, 461–462; 379/211.01, 212.01; 709/238; 370/238, 338, 349, 352, 353, 389, 370/392, 395.52
See application file for complete search history.

(56) References Cited

U.S. PATENT DOCUMENTS

| 5,325,362 | A | * | 6/1994 | Aziz ........................ 370/405 |
| 5,448,623 | A | * | 9/1995 | Wiedeman et al. ......... 455/430 |
| 5,452,349 | A | * | 9/1995 | Uehara et al. ......... 379/220.01 |
| 5,572,528 | A | * | 11/1996 | Shuen ....................... 370/402 |
| 5,673,308 | A | * | 9/1997 | Akhavan .................... 455/461 |
| 5,711,011 | A | * | 1/1998 | Urs et al. ................... 455/520 |
| 5,774,805 | A | * | 6/1998 | Zicker ........................ 455/426 |
| 5,845,207 | A | * | 12/1998 | Amin et al. ................ 455/414 |
| 5,848,098 | A | * | 12/1998 | Cheng et al. ............... 375/220 |
| 5,854,977 | A | * | 12/1998 | Oksanen et al. ............ 455/417 |
| 5,862,345 | A | * | 1/1999 | Okanoue et al. ........... 709/238 |
| 5,873,033 | A | * | 2/1999 | Hjern et al. ................ 455/417 |
| 5,887,259 | A | * | 3/1999 | Zicker et al. ............... 455/434 |
| 5,901,357 | A | * | 5/1999 | D'Avello et al. ........... 455/454 |
| 6,061,650 | A | * | 5/2000 | Malkin et al. .............. 704/228 |
| 6,144,671 | A | * | 11/2000 | Perinpanathan et al. .... 370/409 |
| 6,243,758 | B1 | * | 6/2001 | Okanoue .................... 370/392 |
| 6,445,710 | B1 | * | 9/2002 | Perlman et al. ............ 370/401 |
| 6,496,505 | B1 | * | 12/2002 | La Porta et al. ........... 370/392 |
| 6,757,274 | B1 | * | 6/2004 | Bedingfield et al. ....... 370/352 |
| 2002/0015396 | A1 | * | 2/2002 | Jung ........................ 370/338 |

* cited by examiner

*Primary Examiner*—William Trost
*Assistant Examiner*—James D. Ewart
(74) *Attorney, Agent, or Firm*—Schiff Hardin LLP

(57) ABSTRACT

Calls (ar) directed to wireless communication terminal equipment (KE) wirelessly connected to base stations (BS-H) of a home area (H) and to a communication network (KN) are switched to the appertaining base station (BS-H) in the home area (H) using the communication network (KN). The availability of the called wireless communication terminal equipment (KE) is determined using the base station. Given non-availability of the called wireless communication terminal equipment (KE), the calls (ar) are rerouted to the communication network (KN) using the performance feature of "call deflection" provided in the base station (BS-H) in the home area (H). The method can be integrated into existing communication networks (KN) with minimal outlay.

9 Claims, 1 Drawing Sheet

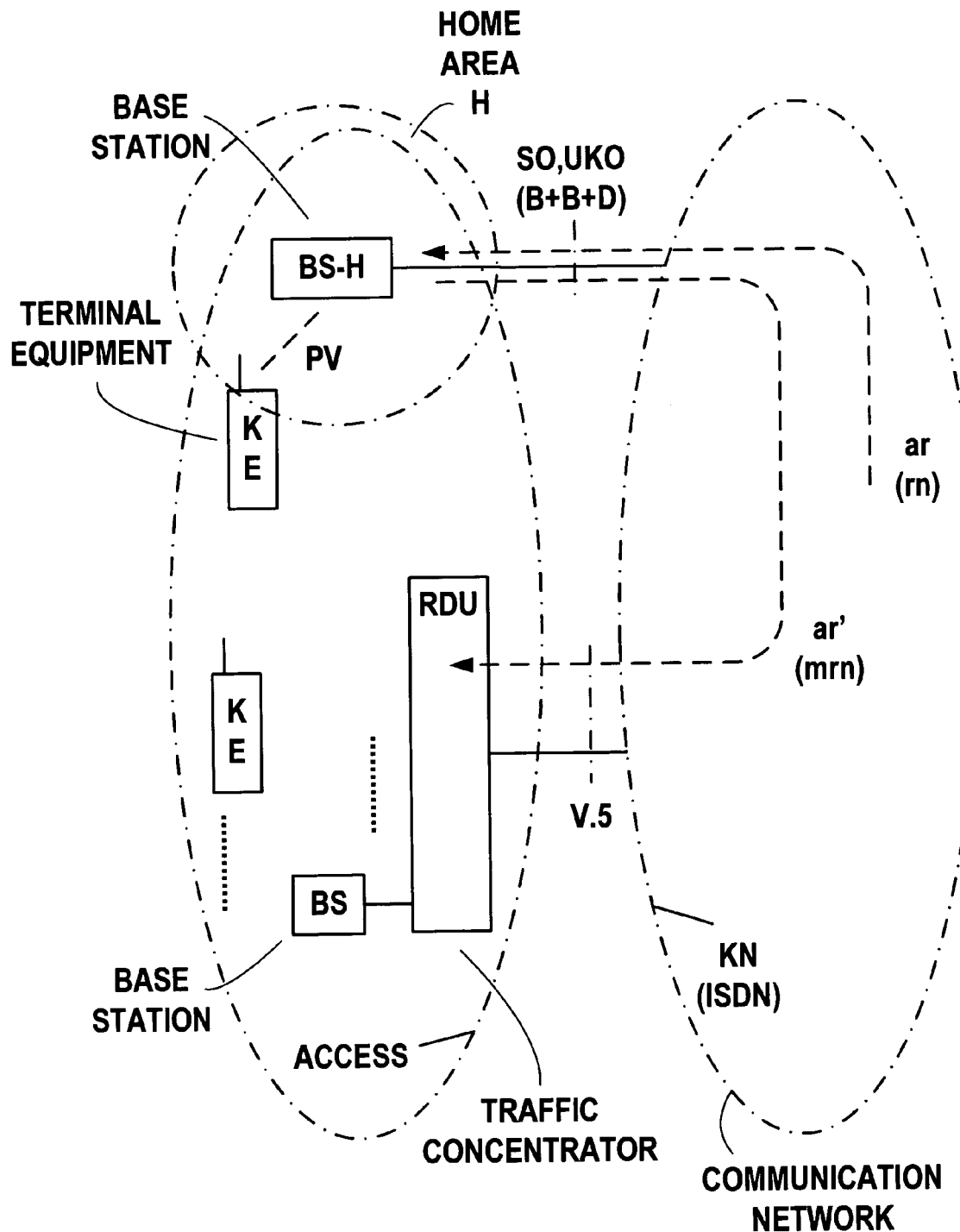

METHOD FOR CALL CONTROL OF COMMUNICATION TERMINAL EQUIPMENT WIRELESSLY CONNECTED TO COMMUNICATION NETWORKS

BACKGROUND OF THE INVENTION

Wireless communication terminal equipment (also known in the technical field as "cordless" or as cordless terminal equipment) that are wirelessly connected to base stations arranged in the home area are utilized in home areas or, respectively, residential areas. The air interface is thereby realized according to the DECT standard (Digital Enhanced Cordless Telecommunications) further standards such as, for example, the GAP standard (Generic Access Profile) are provided for future wireless communication terminal equipment and base stations, whereby these further standards are based on the DECT standard and respectively provide additional application-specific functions. Advantageously, the base stations are connected via an ISDN basic access to an ISDN communication network, whereby the ISDN basic access comprises two message channels with a bandwidth of 64 kbit/s for two connections for a data or voice information communication and one signaling channel for the communication of signaling information. The wireless communication terminal equipment are thereby called with a telephone number of the public ISDN communication network, whereby a call is switched to the appertaining base station or, respectively, to the wireless communication terminal equipment.

Further, sub-communication networks or, respectively, offering networks wherein wireless communication terminal equipment are wirelessly or, respectively, cordlessly connected to base stations are planned for communication networks, particularly public ISDN communication networks. The air interface of the wireless connections is likewise realized according to the DECT standard. The wireless communication terminal equipment as well as the base stations are realized according to the GAP standard or a CAP standard (CTM (cordless terminal mobility) access profile) currently being standardized, whereby these standards are based on the DECT standard for the air interface. Special mobile telephone numbers with whose assistance connections can be set up from the ISDN communication network to the wireless communication terminal equipment can be provided for such wireless communication terminal equipment. A call with, for example, a mobile telephone number, initiated in the public communication network is switched via the corresponding offering network or, respectively, the base station thereof involved, being switched to the wireless communication terminal equipment identified by the mobile telephone number. The wireless communication terminal equipment thereby represents a communication terminal equipment of the public communication network, particularly of a public ISDN communication network.

It is also provided that a wireless communication terminal equipment is employable both in the home region as well as in the public communication network, whereby wireless communication terminal equipment are multiply present in the home region and a use in the public communication network represents an advantageous expansion. Since the home at the public area can overlap in view of the radio areas, the wireless communication terminal equipment will often be located in two areas in which they can be reached or, respectively, from which connections can be set up into the respective areas.

SUMMARY OF THE INVENTION

It is an object of the present invention to provide a call controller or, respectively, switching-oriented controller of calls that is simple to realize for an additional use of wireless communication terminal equipment in public communication networks.

An important aspect of the inventive method is that calls directed to a wireless communication terminal equipment are switched (using the communication network) to the appertaining base station in the home area and the latter determines the availability of the called wireless communication terminal equipment. Given a non-reachability of the called wireless communication terminal equipment, the call is rerouted to the sub-communication network or, respectively, offering network using the appertaining base station. Consequently, a determination is first made with the inventive method as to whether the respective wireless communication terminal equipment can be reached in the "cost-beneficial" home area and the call is rerouted onto the public offering network on given non-availability. In the sub-communication network or, respectively, offering network, a call setup for the rerouted call is initiated using the mobile telephone number of the respective wireless communication terminal equipment, being initiated to the respective wireless communication terminal equipment. As a result of the inventive method, the additional use of wireless communication terminal equipment designed for the home area is possible in the existing communication networks with the fewest modifications. At the same time, this means a low outlay for the implementation of the inventive method.

The availability of the wireless communication terminal equipment is advantageously determined using a paging method provided in the base station BS-H of the home area H. Such paging methods have already been frequently realized in wireless connections and can be advantageously co-employed without modifications, whereby the paging method is advantageously implemented according to the known DECT standard.

Advantageously, the communication network represents a public ISDN communication network. Given an ISDN communication network, the rerouting of the call is realized by the ISDN performance feature of "call deflection". By employing this ISDN performance feature of "call deflection" or call rerouting, the implementation outlay of the inventive method is further reduced. Given an implementation of the inventive method in an ISDN communication network, the communication terminals are advantageously realized by a So or UKO-ISDN basic access (SO).

According to further advantageous development of the inventive method, the wireless connection of wireless communication terminal equipment to the base stations in the home area is realized according to the DECT or GAP standard and the wireless connection of wireless communication terminal equipment in the offering network (that is, in the public communication network) is realized according to the DECT or CAP standard.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

The single FIGURE depicts a block circuit diagram of the present invention.

DESCRIPTION OF THE PREFERRED EMBODIMENTS

The single FIGURE shows a communication network KN (indicated by dot-dash lines) that is formed by a sub-communication network, particularly an offering network ACCESS and a base station BS-H of a home area H (indicated by dot-dash lines). The communication network KN is advantageously realized by an ISDN communication network ISDN. An ISDN basic access SO, UKO of the ISDN communication network ISDN is provided for the connection of the base station BS-H in the home area. The ISDN basic access SO, UKO has two message channels B, each having a respective bit rate of 64 kbit/s, and a signaling channel D, having a bit rate of 16 kbit/s.

A traffic-concentrating means RDU (Radio Distribution Unit) is connected via a further terminal of the ISDN communication network ISDN that, for example, is realized by a V.5 interface. This means RDU is connected to base stations BS of the offering network ACCESS. Both the radio areas of these base stations BS as well as those of the further traffic-concentrating means RDU and the appertaining trunk lines (not shown) represent the offering network ACCESS. Both the ISDN communication network ISDN as well as the offering network ACCESS represent public communication networks that can also be represented by a single ISDN communication network in which uniform telephone numbers are provided for wire-bound and wireless communication terminal equipment. Alternatively, these publicly accessible communication networks can also be installed and operated by private operators.

Wireless communication terminal equipment KE are connected to the base stations BS-H, BS both in the offering network ACCESS as well as in the home area H. The air interface is thereby realized according to the known DECT standard. The wireless communication terminal equipment KE and the base stations BS-H can be fashioned according to the GAP standard (generic access profile) in the residential/private domain. In the offering network ACCESS, the base stations BS and the wireless communication terminal equipment KE can be alternatively realized by a CAP standard, that is, a CTM (cordless terminal mobility) access profile.

The ISDN basic access SO, UKO or, respectively, the base station BS-H and the wireless communication terminal equipment KE connected thereto can be reached via a telephone number rn, whereby the telephone number rn represents an ISDN communication network-specific telephone number rn. The wireless communication terminal equipment KE wirelessly connected in the home area H are subscribed in the respective base station BS-H and are utilized for a call setup.

A call setup to the wireless communication terminal equipment KE of the offering network ACCESS is implemented using a mobile telephone number mrn. This mobile telephone number mrn differs from the telephone number rn of the ISDN communication network ISDN and may be treated differently in terms of fee scheduling. The mobile telephone number mrn need not be known to the subscriber or, respectively, communication terminal equipment KE since the call (ar) in the inventive method is always switched first to the base station BS-H in the home area H. Given uniform telephone numbers rn, the mobile telephone number mrn can also be potentially unknown to the user and a call setup to the offering network ACCESS can ensue with the communication network-specific telephone number rn.

Let it be assumed for the exemplary embodiment that a wireless communication terminal equipment KE of the home area H can also be used in the offering network ACCESS. This means an additional, advantageous use of the wireless communication terminal equipment KE already present in the home area H. Inventively, a call ar directed to a wireless communication terminal equipment KE is first fundamentally switched to the base station BS-H of the home area H, whereby subscription or, respectively, a utilization permit is provided for the called wireless communication terminal equipment KE both for the home area H as well as for the offering network ACCESS or, respectively, the ISDN communication network ISDN. Given a call ar incoming in the base station BS-H, a check is made using the "wireless" paging method defined in the DECT standard (indicated in the single FIGURE by the designation PV) to determine if the called wireless communication terminal KE can be reached. When the called wireless communication terminal equipment can be reached, the incoming call ar is switched to the wireless communication terminal equipment KE.

Given a finding of non-availability of the called wireless communication terminal equipment KE, the base station BS-H initiates a rerouting of the incoming call ar to the offering network ACCESS. This rerouting is meaningful since the called wireless communication terminal KE could be located in the radio coverage area of the base stations BS of the offering network ACCESS. Instead of the telephone number rn of the ISDN communication network ISDN, the mobile telephone number mrn (insofar as it is provided) is inserted into the rerouted call ar'. In the offering network ACCESS, a call setup to the called wireless communication terminal equipment KE is initiated via the appertaining base station BS. If non-availability of the called wireless communication terminal equipment KE is also found in this call setup, the call (AR) is rejected. A non-availability of the wireless communication terminal equipment KE is present, for example, when this is turned off, that is, when it is in the currentless condition.

The inventive method defines an unambiguous procedure in order to establish connections, that is, calls ar, that are directed to a wireless communication terminal equipment KE that is subscribed or, respectively, authorized both in the home area H as well as in the offering network ACCESS of the ISDN communication network ISDN, whereby the existing communication network is not influenced or, respectively, modified. The inventive method, consequently, can be implemented with the least outlay in the already existing communication network KN, particularly the ISDN communication network ISDN and the home area H, whereby existing ISDN and performance features such as the paging method and "call deflection" are used for the rerouting of calls (ar) in the base station BS-H in the home area H. The implementation outlay is additionally reduced as a result thereof.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling calls in a communication network, comprising the sequential steps of:
 calling, using a telephone number, wireless communication terminal equipment wirelessly connected to base stations of a home area, the base stations being connected to communication terminals of the communication network, and the wireless communication terminal equipment being additionally wirelessly connected to a sub-communication network of the communication network;
 switching calls directed to a called wireless communication terminal equipment always and automatically to an appertaining base station in the home area using the communication network;
 determining an availability of the called wireless communication terminal equipment using a paging procedure by said appertaining base station in the home area in response to said switching of calls;
 rerouting the call, given non-availability of the called wireless communication terminal equipment, to the sub-communication network using the appertaining base station; and
 initiating a call setup for a rerouted call in the sub-communication network using a mobile telephone number of the called wireless communication terminal equipment, the rerouted call being initiated for the respective wireless communication terminal equipment.

2. The method according to claim 1, wherein the paging procedure is implemented according to a DECT standard.

3. The method according to claim 1, wherein at least one of the communication network and the sub-communication network is a public ISDN communication network.

4. The method according to claim 1, wherein the rerouting of the call is realized using an ISDN performance feature of "call deflection".

5. The method according to claim 1, wherein the communication terminal is realized by one of an SO access and UKO-ISDN basic access.

6. The method according to claim 1, wherein wireless connection of wireless communication terminal equipment to the base stations in the home area is realized according to one of DECT standard.

7. The method according to claim 1, wherein wireless connection of wireless communication terminal equipment to basic stations is realized according to one of a DECT standard and a CAP standard.

8. A method for controlling calls in a public ISDN communication network, comprising the sequential steps of:
 calling, using a telephone number, wireless communication terminal equipment wirelessly connected to base stations of a home area, the base stations being connected to communication terminals of the communication network, and the wireless communication terminal equipment being additionally wirelessly connected to an ISDN sub-communication network of the ISDN communication network;
 switching calls directed to a called wireless communication terminal equipment always and automatically to an appertaining base station in the home area using the communication network;
 determining an availability of the called wireless communication terminal equipment being determined using a paging procedure by said appertaining base station in the home area in response to said switching of calls;
 initiating a call setup for a rerouted call in the sub-communication network using a mobile telephone number of the called wireless communication terminal equipment, the rerouted call being initiated for the respective wireless communication terminal equipment; and
 rerouting the call, given non-availability of the called wireless communication terminal equipment, to the sub-communication network using the appertaining base station and using an ISDN performance feature of "call deflection".

9. The method according to claim 8, wherein the paging procedure is implemented according to a DECT standard.

* * * * *